J. A. SNEE, Jr. & T. H. KERR.
WIND WHEEL LOAD REGULATOR.
APPLICATION FILED OCT. 29, 1913. RENEWED OCT. 29, 1914.
1,142,538.
Patented June 8, 1915.
2 SHEETS—SHEET 1.
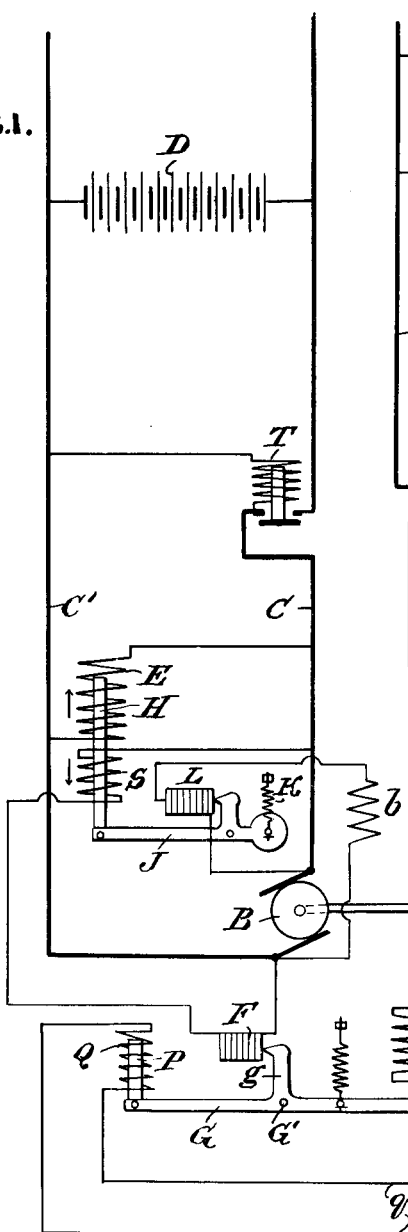
FIG.1.
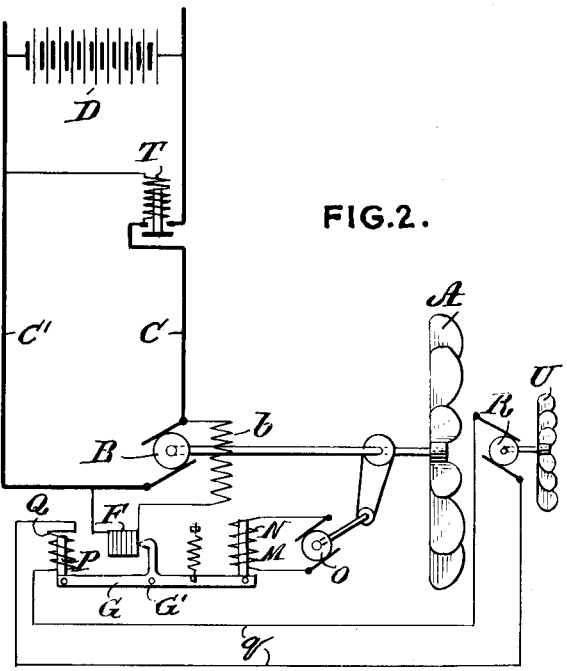
FIG.2.
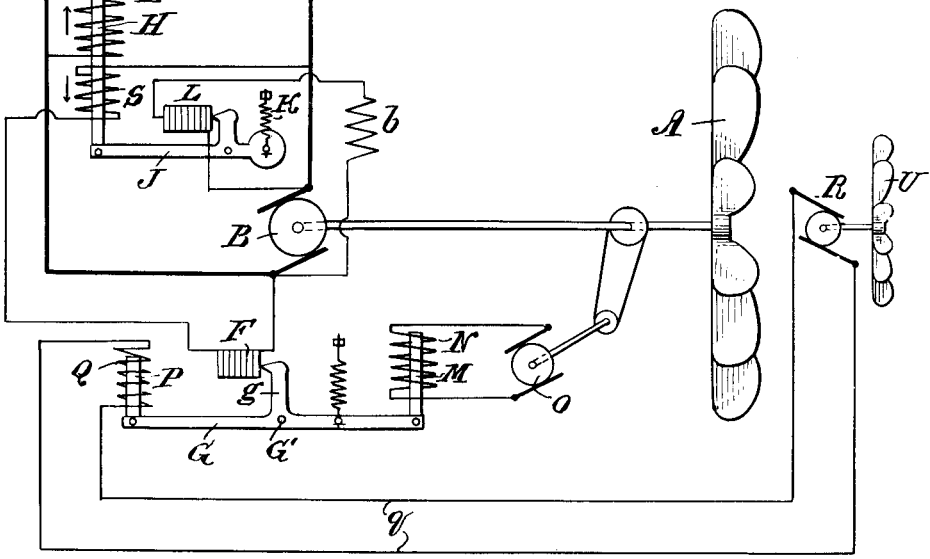
WITNESSES
INVENTORS

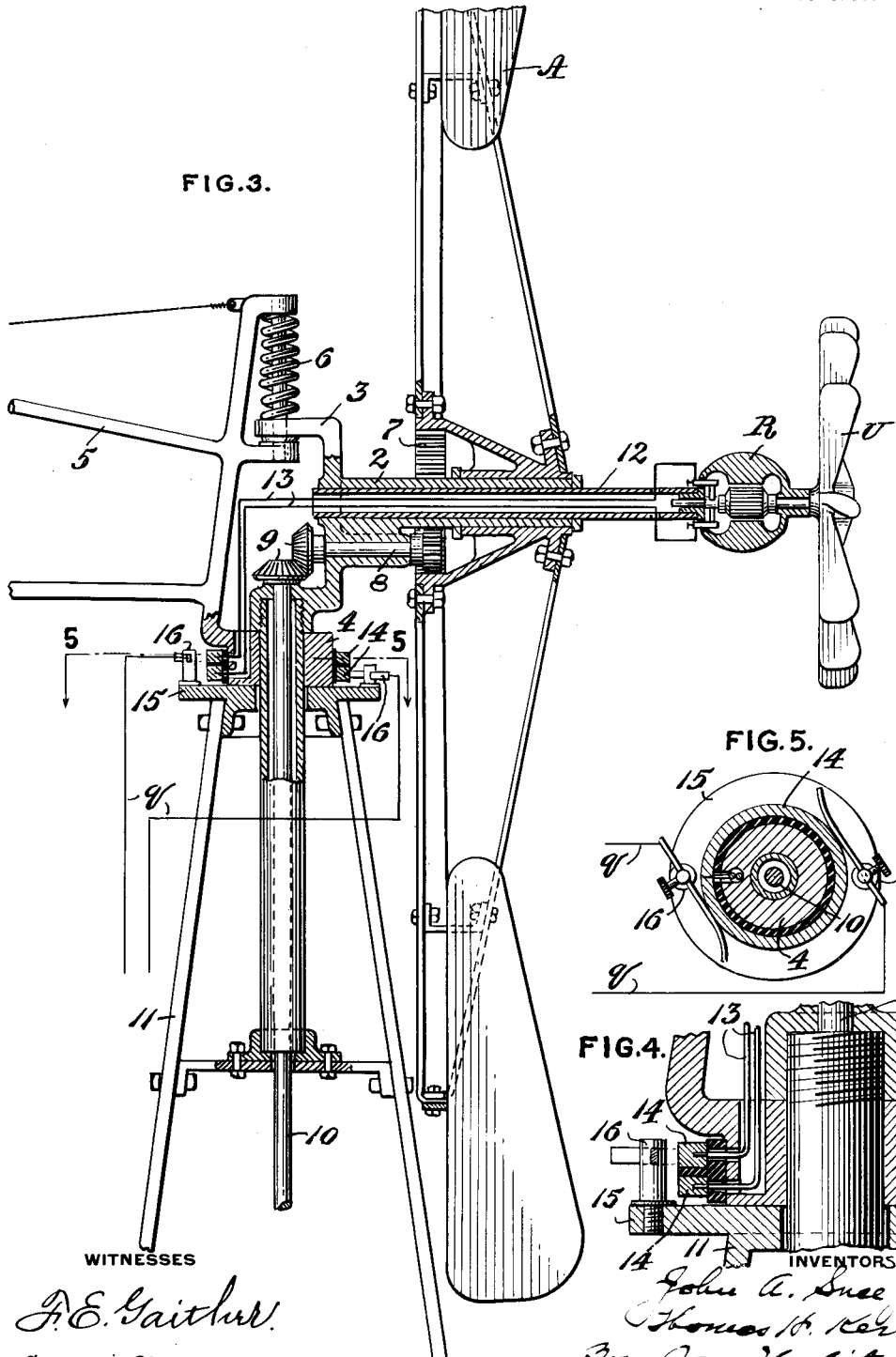

UNITED STATES PATENT OFFICE.

JOHN A. SNEE, JR., OF WEST ELIZABETH, AND THOMAS H. KERR, OF PITTSBURGH, PENNSYLVANIA, ASSIGNORS TO SAID SNEE AND WILLIAM SNEE, OF WEST ELIZABETH, PENNSYLVANIA.

WIND-WHEEL-LOAD REGULATOR.

1,142,538.  Specification of Letters Patent.  Patented June 8, 1915.

Application filed October 29, 1913, Serial No. 797,994. Renewed October 29, 1914. Serial No. 869,346.

*To all whom it may concern:*

Be it known that we, JOHN A. SNEE, Jr., and THOMAS H. KERR, both citizens of the United States, and residents of West Elizabeth and Pittsburgh, respectively, in the county of Allegheny and State of Pennsylvania, have invented certain new and useful Improvements in Wind-Wheel-Load Regulators, of which the following is a specification.

The primary object of this invention is to provide efficient means actuated by the wind independently of the wind wheel for regulating the load of the latter, whereby such ratio is maintained between the speed of the wheel and the velocity of the wind that the wheel will develop maximum power in all winds of sufficient force to operate it, regardless of wind velocity variations, excepting only such extremely high winds as are not available for power development.

It is well understood that a wind wheel converts a maximum amount of wind energy into mechanical power when the peripheral speed of the wheel is a certain fraction of the wind velocity, the fraction varying in wheels of different design. Efficient results are obtained when the tip speed of the wheel is approximately seven-tenths that of the wind velocity. But even though some different average speed ratio may be found desirable, it is a purpose of the invention to utilize a separately operated wind actuated device for maintaining such speed ratio, whatever it may be, in winds varying widely in velocity so that the greatest efficiency is always attained.

In the adaptation herein shown and described, the wind wheel is utilized for driving an electric generator, and the wheel load is varied by varying the current flow through the generator field, the flow increasing and decreasing with increase and decrease of the wind velocity. This current flow is regulated in such manner as to so vary the load that the wheel is maintained at its most efficient speed in all available wind velocities, all as fully described hereinafter.

The controlling means may be utilized in conjunction with a primary voltage controlling means, in such use being in effect a sub-controller, and such an arrangement is illustrated diagrammatically in Figure 1. Or the improved mechanism may be utilized directly or as a primary voltage controller, as in the diagrammatic illustration of Fig. 2. Fig. 3 is a view of a portion of a wind wheel, shown partly in elevation and partly in vertical section, together with the supplemental or speed controlling wheel and generator driven thereby. Fig. 4 is a vertical cross section of a portion of the main wheel mounting drawn to a larger scale than Fig. 3. Fig. 5 is a sectional plan on line 5—5 of Fig. 3.

Referring to the drawings, A designates a wind wheel which is geared to an electric generator B.

C and C' are the generator leads to an external circuit, and arranged in parallel with such circuit is storage battery D.

In the adaptation of Fig. 1, the current flow through shunt field winding $b$ of generator B is regulated by a variable resistance L, preferably of carbon pile type, which is acted upon by a lever J with one end of the lever under the tension of spring K, and its opposite end connected to core H of solenoid coil E, the latter being in shunt with the external circuit. It will be understood, however, that we do not confine ourselves to a carbon pile resistance, as any other form of variable resistance suitable for the work may be employed. Solenoid E—H and spring K oppose each other in such manner that a voltage balance is maintained between generator B and the external circuit. The external circuit may include an automatic switch T which closes only when sufficient voltage has been attained for charging battery D. No novelty is claimed herein for the regulating means thus far described.

In the present adaptation, the invention herein is utilized for increasing the current flow through the generator field with increasing speed of the wind wheel, thereby increasing its load. This is accomplished by varying the resistance of a circuit containing auxiliary coil S which is in shunt with the external circuit and wound on the spool with coil E in such manner as to counteract its pull on core H and thereby permit spring K to predominate and compress resistance L and thereby increase the current flow through the generator field. In the circuit with coil S is a variable resistance F preferably of carbon pile form, and this resistance controls the counteracting effect of coil S on coil E.

Resistance F is controlled by lever G fulcrumed between its ends at G', with an arm g adapted to engage the carbon pile for compressing the same. Connected to one end of lever G is core M of solenoid coil N, the latter being energized by a small generator O which is suitably geared to wheel A. Connected to the other end of lever G is core P of solenoid Q, the leads q of which extend to a magneto R driven by a small supplemental wind wheel U arranged preferably concentrically with and in front of the main wheel A and operated independently of the latter. The arrangement is such that generator O is driven by wheel A at a rotative speed equal to that of the smaller wheel U when the peripheral speed of wheel A is the desired fraction of the wind velocity, for instance seven-tenths of the latter. Solenoids N and Q are of equal strength when wheels A and U are operating at the desired relative speeds. In the event of departure from this condition the greater pull of one or the other solenoid alters the compression of resistance F, which in turn changes the current flow through coil S and correspondingly changes the combined effect of coils E and S on core H, thereby so altering or varying the load of main generator B as to cause the wheel to operate at its most efficient speed. Consider, for instance, that wheel U is running freely in a constant wind, with main wheel A operating at a speed which extracts the greatest amount of energy from such wind. Then if the wind velocity suddenly increases, the smaller and lighter wheel U forges ahead of the main wheel, and the pull of solenoid Q being thereby increased, lever G is operated to permit resistance F to relax or expand and decrease the current flow through coil S and lessen the reacting effect of the latter on coil E. The effective pull of coil E being thus increased, the compression of resistance L is decreased, less current flows through the generator field b and the load on main wheel A is correspondingly decreased. This lessening of the load of wheel A enables it to speed up, and this it does until the resulting accelerated speed of small generator O sufficiently energizes solenoid N to cause its pull to oppose solenoid Q, and in so doing compress resistance F to such an extent as to establish the desired ratio between wheel velocity and wind velocity. By this means the control of resistance F and booster coil S is so regulated that a substantial balance is maintained between the two wind wheels, with the main wheel A always operating approximately at its most efficient speed. The governing wheel U runs substantially free, the imposed load from small magneto R not being sufficiently appreciable to interfere with its desired sensitiveness.

The automatic regulation above described may be so arranged as to act directly on field b of generator B as in Fig. 2, in which case resistance F is in series with the shunt field winding and operates to directly control the current flow through the field, instead of indirectly as in the adaptation shown in Fig. 1. So far as maintaining a balance between the two wind wheels is concerned, the operation is the same in both adaptations, although the arrangement shown in Fig. 2 may be less desirable because of the increased amount of current necessary for solenoid Q, thereby retarding somewhat the free running of wheel U and to that extent rendering the automatic control less sensitive than with the arrangement illustrated in Fig. 1.

Figs. 3, 4 and 5 illustrate a desirable arrangement of mechanical means for supporting the two wheels, and the generator driven by the smaller wheel, also means for accommodating the leads from the generator to the movement of the wheels on the supporting derrick. Wheel A is rotatable about the hollow bearing 2 projecting from the usual frame 3 which is rotatable about a vertical axis on head 4, the latter carrying vane 5, spring 6 serving to hold the wheel A facing the wind, all as is usual in wind wheel practice. The power from wheel A is transmitted through the internal gear 7 to horizontal shaft 8 and from the latter through beveled gears 9 to the vertical shaft 10 journaled in derrick 11.

Projecting frontwardly from bearing 2 is the tubular support 12 on which is mounted the small magneto generator R, the armature of which is driven by the smaller wind wheel U, the latter being thus positioned in front of and concentrically with the main wheel A. Leads 13 from generator R extend backwardly through tubular support 12 to rings 14 which are insulated from each other on head 4 and rotatable therewith on the derrick top plate 15. Secured to this plate are the brush contacts 16, one for each ring 14, to which are connected leads q which extend to solenoid Q. The smaller or governing wheel is thus supported in the wind in front of but without in any way interfering with the operation of the larger wheel.

As the invention contemplates broadly utilizing the wind force acting on a device independently of the main wheel for so regulating the load of the latter that its peripheral speed will be in predetermined ratio to the velocity of the wind and regardless of velocity variations, the invention is not restricted to the specific means herein shown and described for accomplishing that result, and it will, therefore, be understood that the invention may be variously embodied and applied without departing from the spirit and scope of the appended claims.

A storage battery is shown herein only as a means for taking care of or storing the electrical energy as it is generated. Either manually operated or automatic means, not shown, may be employed for turning the wheel out of the wind when the battery is fully charged. It will be understood that the disposition of the current derived from the main generator does not concern the present invention.

We claim:—

1. The combination of a wind wheel, a dynamo electric generator actuated by the wheel, the generator having an electro-magnetic field, and wind actuated means operated independently of said wheel for varying the current flow through the generator field.

2. The combination of a wind wheel, a dynamo electric generator actuated by the wheel, the generator having an electro-magnetic field, a variable resistance in series with the generator field, and a wind actuated device operated independently of said wheel for varying said resistance.

3. The combination of a wind wheel, a dynamo electric generator actuated by said wheel, the generator having an electro-magnetic field, a variable resistance in series with the generator field, and wind-actuated means operated independently of the wheel for decreasing said resistance with increasing wind velocity.

4. The combination of a wind wheel, a dynamo electric generator actuated by said wheel, the generator having an electro-magnetic field, opposed controlling means for varying the current flow through the generator field, actuating means for one of the controlling means operatively connected to the wind wheel, and wind actuated means operated independently of the wind wheel for actuating the other controlling means.

5. The combination of a wind wheel, a dynamo electric generator actuated by said wheel, the generator having an electro-magnetic field, a supplemental wind wheel, and means actuated by the supplemental wheel for varying the current flow through the generator field.

6. The combination of a wind wheel, a dynamo electric generator actuated by said wheel, the generator having an electro-magnetic field, a variable resistance in series with the generator field, and a supplemental wind wheel operatively connected to the resistance and adapted to vary the current flow through the latter with variations in the wind velocity.

7. The combination of a wind wheel, a dynamo electric generator actuated by said wheel, the generator having an electro-magnetic field, a variable resistance device for controlling the current flow through the generator field, two opposed actuating means operatively connected to said resistance device, means actuated by the wind wheel for operating one of said actuating means, and a supplemental wind wheel operatively connected to the other of said actuating means.

8. The combination of a wind wheel, a dynamo electric generator actuated by said wheel, the generator having an electro-magnetic field, a variable resistance for controlling the current flow through the generator field, two opposed electrically operated means for controlling said resistance, an auxiliary generator actuated by the wind wheel for supplying current to one of said means, and a wind actuated electric generator independent of said wind wheel for the other of said means.

9. The combination of a wind wheel, a dynamo electric generator actuated by said wheel, the generator having an electro-magnetic field, a variable resistance for controlling the current flow through the generator field, a motion transmitting device operatively connected to the resistance, two solenoids operatively connected to said device and adapted, respectively, to move the same in opposite directions, an electric generator for one of the solenoids geared to the wind wheel, an electric generator for the other solenoid, and wind actuated means independent of the wind wheel for actuating the last named generator.

10. The combination of a wind wheel, a dynamo electric generator actuated thereby, the generator having an electro-magnetic field, a variable resistance for controlling the current flow through the generator field, a lever for actuating the variable resistance, two opposed force transmitting devices for moving the lever in reverse directions, means actuated by the wind wheel for supplying force to one of said devices, and a wind actuated device independent of the wind wheel for supplying force to the other of said lever actuating devices.

11. The combination of a main wind wheel, a supplemental wind wheel, and means actuated by the supplemental wheel for varying the torque of the main wheel with wind velocity variations.

12. The combination of a main wind wheel, a supplemental wind wheel smaller than and in advance of the main wheel and operated independently thereof, and means actuated by the supplemental wheel for varying the torque of the main wheel with wind velocity variations.

13. The combination of a main wind wheel, a supplemental wheel operating independently of the main wheel, an electric generator actuated by the supplemental wheel, and electrically controlled load-regulating means for the main wheel energized by said generator and adapted to vary the main wheel torque with wind velocity variations.

14. The combination of a main wind wheel, a support projecting frontwardly from the wheel center and about which the wheel rotates, an electric generator on the support, a supplemental wheel on the support for actuating the generator, and electrically operating load-regulating means for the main wheel adapted to receive current from the generator for varying the main wheel torque with wind velocity variations.

15. The combination of a main wind wheel, a dynamo electric generator actuated thereby, the generator having an electromagnetic field, a variable resistance for controlling the current flow through the generator field, two opposed electrically operated devices operatively connected to the variable resistance, a generator operatively connected to the main wheel for supplying current to one of said devices, a support projecting frontwardly from the main wheel, an electric generator mounted on said support and connected to the other of said resistance operating devices, and a supplemental wind wheel mounted on said support for actuating the said support-sustained generators.

16. The combination of a main wind wheel, a derrick, a support for the wheel rotatable in the derrick about a vertical axis, a tubular support projecting outwardly from the main wheel, a supplemental wind wheel mounted on the tubular support, an electric generator mounted on the tubular support and actuated by the supplemental wheel, leads from the generator extending through the tubular support, rings arranged concentrically about the vertical axis of the main wheel support and insulated from each other with the generator leads connected to the respective rings, contact brushes for the rings, and electrically actuated load-regulating means for the main wheel with leads extending from the regulating means to said brushes.

In testimony whereof we affix our signatures in presence of two witnesses.

JOHN A. SNEE, Jr.
THOMAS H. KERR.

Witnesses:
J. M. Nesbit,
F. E. Gaither.